3,446,591
PREPARATION OF TRIMERIC RUTHENIUM
TETRACARBONYL
Piero Pino, Pisa, and Guiseppe Braca, S. Frediano A
Settino, Pisa, Italy, assignors to Lonza Ltd., Gampel,
Valais, Switzerland
No Drawing. Application July 29, 1965, Ser. No. 475,840,
now Patent No. 3,387,932, dated June 11, 1968,
which is a continuation-in-part of application Ser. No.
341,132, Jan. 29, 1964. Divided and this application
Apr. 10, 1968, Ser. No. 720,328
Claims priority, application Switzerland, Feb. 1, 1963,
1,292/63; Aug. 5, 1964, 10,200/64
Int. Cl. C01g 55/00
U.S. Cl. 23—203     2 Claims

ABSTRACT OF THE DISCLOSURE

An orange-red trimeric ruthenium tetracarbonyl is directly prepared by reacting a basic ruthenium carboxylate or rutheium acetylacetonate in an organic solvent with with carbon monoxide and hydrogen at pressures of 150 to 200 atm. and temperatures of 140 to 250° C.

---

This application is a division of our application Ser. No. 475,840, filed July 29, 1965, now Patent No. 3,387,932, which, in turn, is a continuation-in-part of our application Ser. No. 341,132, filed Jan. 29, 1964, and now abandoned.

The invention relates to the preparation of trimeric rutheium tetracarbonyl which is useful as catalyst in Reppe syntheses, hydroformylation and carbonylation processes.

Three different ruthenium carbonyl compounds have been described in the literature, namely an unstable colorless liquid having the formula $Ru(CO)_5$, a solid compound crystallizing ar orange crystals from benzene, whose composition was originally given by M. Manchot and W. J. Manchot (Z. anorg. allg. Chemie 226 (1936), p. 385) as rutheium enneacarbonyl $Ru_2(CO)_9$, and a green crystallized compound to which the formula $[Ru(CO)_4]_3$ was attributed. Recently, the stable form of the compound considered by W. Manchot to be $Ru_2(CO)_9$ was determined by E. Corey and L. Dahl (J. Am. Chem. Soc. 83 (1961), p. 2203) to be $[Ru(CO)_4]_3$. The structure of the green crystallized compound has not yet been confirmed.

Heretofore, the trimeric ruthenium tetracarbonyl had been prepared either from metallic rutheium sponge, or from inorganic ruthenium salts such as $RuS_2$ or halides, which were reacted with carbon monoxide under high pressure. In all said reactions, there is first formed rutheium pentacarbonyl, which is a volatile liquid of low stability and must be isolated; such recovery procedure involves inconvenient manipulations and results in a low yield of trimeric ruthenium tetracarbonyl in the subsequent synthesis.

When reacting CO with an organic ruthenium salt, a direct formation of trimeric ruthenium tetracarbonyl in a single step process was never observed.

It is a principal object of the invention to provide a process for the preparation of trimeric ruthenium tetracarbonyl which avoids the drawbacks presented by the intermediate formation of ruthenium pentacarbonyl.

Other objects and advantages will be apparent on consideration of the specification and claims.

According to the invention, trimeric ruthenium tetracarbonyl is prepared by reacting an organic ruthenium salt with carbon monoxide and hydrogen in the presence of an organic liquid which under the reaction conditions is a solvent for the ruthenium salt, CO and $H_2$, at a temperature of 140 to 250° C., preferably 150 to 200° C., and at a pressure of 50 to 350 atm., preferably 150 to 200 atm. Suitable organic liquids which are solvents for the reactants under the reaction conditions are, for instance, benzene and similar aromatic hydrocarbons. Suitable such solvents are benzene methyl ketones, e.g. acetone, and aliphatic monohydric alcohols having 1 to 4 carbon atoms, such as methanol, proponal, insopropanol, n-butanol, and others.

The reaction can be carried out even with water as solvent though the formation of decomposition and by-products will result in lower yields.

Suitable ruthenium compounds are, for instance, the basic rutheium salts of carboxylic acids, such as basic ruthenium benzoate, basic ruthenium succinate, basic ruthenium acetate and the ruthenium acetylacetonate, which is our preferred starting material.

The reaction pressure may be adjusted by forcing a mixture of carbon monoxide and hydrogen in a molar ratio in the range of 5:1 to 1:1, preferably 3:1 to 2.5:1, into the reaction. Any type of pressure-resistant vessel can be used; we prefer to use reactors in which the reaction medium can be shaken, agitated or vibrated.

After termination of the reaction, the formed trimeric ruthenium tetracarbonyl is present essentially in the form of orange-red crystalline platelets in the solvent. The mother liquor can be processed in various ways. It may be distilled off, after separation from the trimeric ruthenium carbonyl, in vacuo whereupon additional trimeric ruthenium tetracarbonyl may be recovered by dissolving it out of the residue, e.g., with acetone, and recrystallization. In another modification, the mother liquor is, prior to or after separation from the trimeric ruthenium tetracarbonyl, left standing for several hours, for instance 3 to 24 hours, in an inert gas atmosphere, for instance carbon monoxide or nitrogen. Such treatment produces an increase of the yield of the trimeric ruthenium tetracarbonyl. It is of course of advantage to recover first the crystalline trimeric ruthenium tetcarbonyl formed in the reaction before the mother liquor is subjected to the after-treatment in an inert gas atmosphere.

Finally, the mother liquor may, after recovery, of the trimeric ruthenium tetracarbonyl, be processed for the recovery of metallic ruthenium by evaporating the solvent, calcining the residue, and treating it with hydrogen.

The process of the invention does not only produce high yields but offers the further advantage of a simple recovery of the trimeric ruthenium tetcarbonyl because substantially no insoluble by-products are obtained.

In order to illustrate the invention, the following specific examples are given. It will be understood that variations from the particular compounds and proportions can be made without departing from the invention.

Example 1

3.2 g. of ruthenium acetylacetone were placed in a shaking autoclave of stainless steel having a capacity of 125 cm.³. The air was swept out, and 30 cm.³ of methanol were introduced. Subsequently, a mixture of carbon monoxide and hydrogen in a molar ratio of 3:1 was forced into the autoclave until a pressure of 155 atm. was reached, and the autoclave was heated at 150 C. for about 4 hours, whereby a slight pressure drop was observed.

After cooling, the autoclave was opened and the discharged gas was passed through a trap cooled with liquid air to crystallized any volatile $Ru(CO)_5$ which might have been formed. No such $Ru(CO)_5$ could be detected.

After emptping the autoclave, 1.17 g. of $[Ru(CO)_4]_3$ could be separated as orange-red platelets from the methanol. Additional 0.133 g. of $[Ru(CO)_4]_3$ were obtained by processing the methanolic mother liquor. The total of 1.303 g. of $[Ru(CO)_4]_3$ corresponded to a yield of 76.3%, calculated on the ruthenium acetylacetonate.

Example 2

The same apparatus as used in Example 1 was filled with 1.06 g. of ruthenium acetylacetonate and 75 cm.³ of benzene. The reaction was carried out at 150 atmospheres under otherwise exactly the same conditions as set forth in Example 1.

The formed trimeric ruthenium tetracarbonyl was completely dissolved in the benzene and was recovered by distilling off the solvent in vacuo. There were obtained 0.35 g. of $[Ru(CO)_4]_3$, corresponding to a yield of 51.5%.

*Analysis.*—Calc'd.: Ru 47.65%. Found: 47.09%.

Example 3

1.21 g. of basic ruthenium acetate (30.1% Ru) and, after displacement of the air, 7 cm.³ of methanol were introduced into the autoclave used for the preceding examples. CO and $H_2$ in a molar ratio of 3:1 were forced into the autoclave until the pressure was 165 atm., and the temperature was raised to 150° C. with shaking. During the reaction, the pressure dropped somewhat. After 3 hours, the reaction was terminated and the autoclave was opened. The discharged gas was passed through a trap cooled with liquid air whereby no $Ru(CO)_5$ could be detected. 0.05 g. of trimeric ruthenium tetracarbonyl could be recovered at the bottom of the autoclave in form of orange-red platelets. The methanolic mother liquor, after distillation of the methanol and recrystallization of the residue from acetone, yielded 0.130 g. of $[Ru(CO)_4]_3$. Calculated on the basic ruthenium acetate, the yield was 23.4%.

Example 4

1.829 g. of ruthenium acetylacetonate and, after displacement of the air, 20 cm.³ of methanol were introduced into the autoclave used for the preceding examples. Subsequently, a mixture of carbon monoxide and hydrogen in a molar ratio of 3:1 was forced into the autoclave until a pressure of 136 atm. was reached, and the autoclave was heated at 200° C. for about 2 hours, whereby a slight pressure drop was observed.

After cooling and emptying the autoclave 0.709 g. of $[Ru(CO)_4]_3$ could be separated from the methanol. Additional 0.172 g. of $[Ru(CO)_4]_3$ were obtained by processing the methanolic mother liquor.

The total of 0.881 g. of $[Ru(CO)_4]_3$ corresponded to a yield of 90% calculated on the ruthenium acetylacetonate.

Formation of trimeric tetracarbonyls of other metals of the VIII group of the periodic system by the reaction of CO and $H_2$ with organic salts of such metals, for instance with the iron salt of acetylacetonate, could not be observed.

It is to be understood that the term in "compound containing a hydrogen atom which is reactive under the reaction conditions" is intended to cover compounds subject to the Zerewitinoff determination (Merck, 7th ed., page 1480), or compounds which may be subjected to the Zerewitinoff determination under the reaction conditions, or compounds which under reaction conditions may form other compounds which may be subjected to the Zerewitinoff determination.

We claim:

1. A process for the direct preparation of an orange-red trimeric ruthenium tetracarbonyl comprising reacting in the absence of air an organic ruthenium compound selected from the group consisting of basic ruthenium salts of carboxylic acids and ruthenium acetylacetonate with a mixture of carbon monoxide and hydrogen in the molar ratio in the range of 5:1 to 1:1 at a temperature of 140 to 250° C. and at a pressure in the approximate range of 150 to 200 atmospheres in the presence of a compound selected from the group consisting of benzene, ketones and aliphatic monohydric saturated alcohols having 1 to 4 carbon atoms, said compound containing a reactive hydrogen atom and being a solvent for the reactants under the reaction conditions, and separating the obtained trimeric ruthenium tetracarbonyl from the reaction medium.

2. The process as claimed in claim 1 comprising carrying out the process in an autoclave, releasing the autoclave pressure after termination of the reaction, and maintaining after said pressure release the solution of the trimeric ruthenium tetracarbonyl during 3 to 24 hours under an inert gas atmosphere, thereby increasing the yield of crystalline trimeric ruthenium tetracarbonyl.

References Cited

UNITED STATES PATENTS

| | | | |
|---|---|---|---|
| 2,473,993 | 6/1949 | Gresham et al. | 23—203 |
| 2,477,554 | 7/1949 | McKeever | 23—203 |
| 2,717,201 | 9/1955 | Passino | 23—203 |
| 2,865,716 | 12/1958 | Hasek | 23—203 |
| 2,880,066 | 3/1959 | Clossom et al. | 23—203 |
| 2,964,387 | 12/1960 | Podall et al. | 23—203 |
| 3,236,597 | 2/1966 | Knap | 23—203 |
| 3,387,932 | 6/1968 | Pino et al. | 23—203 |

FOREIGN PATENTS 860,645  2/1961  Great Britain.

OSCAR R. VERTIZ, *Primary Examiner.*

E. C. THOMAS, *Assistant Examiner.*

U.S. Cl. X.R.

23—87, 126, 211, 212; 75—1, 101